(12) United States Patent
Armstrong et al.

(10) Patent No.: US 7,478,272 B2
(45) Date of Patent: Jan. 13, 2009

(54) REPLACING A FAILING PHYSICAL PROCESSOR

(75) Inventors: William J. Armstrong, Rochester, MN (US); Naresh Nayar, Rochester, MN (US); Gary R. Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 11/241,709

(22) Filed: Sep. 30, 2005

(65) Prior Publication Data

US 2007/0079176 A1 Apr. 5, 2007

(51) Int. Cl.
*G06F 11/00* (2006.01)

(52) U.S. Cl. .............. 714/10; 714/11; 714/12; 714/13; 718/1

(58) Field of Classification Search ............. 714/10–13; 718/1
See application file for complete search history.

(56) References Cited

U.S. PATENT DOCUMENTS

| | | | |
|---|---|---|---|
| 5,345,590 A * | 9/1994 | Ault et al. ................ | 718/1 |
| 6,189,112 B1 * | 2/2001 | Slegel et al. ............. | 714/10 |
| 6,378,021 B1 * | 4/2002 | Okazawa et al. ......... | 710/317 |
| 6,502,206 B1 | 12/2002 | Kosuge et al. | |
| 6,574,748 B1 * | 6/2003 | Andress et al. .......... | 714/11 |
| 6,587,938 B1 * | 7/2003 | Eilert et al. .............. | 712/29 |
| 7,062,674 B2 * | 6/2006 | Takamoto ................ | 714/13 |
| 7,065,641 B2 * | 6/2006 | Schelling ................ | 713/2 |
| 7,137,035 B2 * | 11/2006 | Sato et al. ............... | 714/25 |
| 2003/0037092 A1 | 2/2003 | McCarthy et al. | |
| 2004/0199632 A1 | 10/2004 | Romero et al. | |
| 2004/0221193 A1 * | 11/2004 | Armstrong et al. ........ | 714/10 |

OTHER PUBLICATIONS

U.S. Appl. No. 10/888,391, entitled "System and Method for Predictive Processor Failure Recovery" filed Jul. 18, 2004 by Thomas J. Fox et al.

* cited by examiner

*Primary Examiner*—Yolanda L Wilson
(74) *Attorney, Agent, or Firm*—Biggers & Ohanian, LLP (57) ABSTRACT

Replacing a failing physical processor in a computer supporting multiple logical partitions, where the logical partitions include dedicated partitions and shared processor partitions, the dedicated partitions are supported by virtual processors having assigned physical processors, and the shared processor partitions are supported by pools of virtual processors. The pools of virtual processors have assigned physical processors. Embodiments operate generally by assigning priorities to the dedicated partitions and to the pools of virtual processors; detecting a checkstop of a failing physical processor; retrieving the failing physical processor's state; replacing by a hypervisor the failing physical processor with a replacement physical processor assigned to a dedicated partition or pool, which dedicated partition or pool has the lowest priority among the priorities of the dedicated partitions and pools; and assigning the retrieved state of the failing physical processor as the state of the replacement physical processor.

4 Claims, 7 Drawing Sheets

REPLACING A FAILING PHYSICAL PROCESSOR

CROSS-REFERENCE TO RELATED APPLICATION

This application is related to commonly-assigned application Ser. No. 11/241,695, filed on even date herewith, entitled "ASSIGNING A PROCESSOR TO A LOGICAL PARTITION" and which is hereby incorporated by reference herein in its entirety.

BACKGROUND OF THE INVENTION

1. Field of the Invention

The field of the invention is data processing, or, more specifically, methods, apparatus, and products for replacing a failing physical processor in a computer supporting multiple logical partitions.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area in which advances have been made is in parallel processing of many threads of execution in partitions assigned their own resources and running separate operating systems. The shift in computer hardware and software to a highly parallel, logically partitioned model has provided opportunities for high system availability that were practically nonexistent just a few years ago. One mechanism for maintaining high availability permits dynamic runtime replacement of a processor predicted to fail with an unused processor provided the failing physical processor can continue to function long enough to complete the replacement process. Another mechanism for high availability maintains complete processor state information such that, even in the event of a catastrophic processor failure (e.g., a checkstop), the work a processor is performing can continue on a replacement physical processor. The importance of a replacement physical processor in these recovery mechanisms is readily apparent. It is clear where to acquire these replacements if unused processors are available. Unused processors, however, are generally wasteful and expensive and, as a consequence, are rare on most systems. When a processor checkstops and no unused processors are available a system has two choices: it can terminate the partition or pool to which the failing processor is assigned or the underlying hypervisor can run the partition or pool of virtual processors to which the failed processor is assigned as though the partition or pool has more processors than are physically available. Both these cases are undesirable; in the former the partition is dead, and in the latter, the partition is not running at desired performance levels. Certainly, some partition on the system must suffer if a utilized processor checkstops, but letting chance select the partition to suffer based on a random failing physical processor is not an optimal procedure.

SUMMARY OF THE INVENTION

Methods, apparatus, and products are disclosed for replacing a failing physical processor in a computer supporting multiple logical partitions, where the logical partitions include dedicated partitions and shared processor partitions, the dedicated partitions are supported by virtual processors having assigned physical processors, and the shared processor partitions are supported by pools of virtual processors. The pools of virtual processors have assigned physical processors. The methods, apparatus, and products operate generally by assigning priorities to the dedicated partitions and to the pools of virtual processors; detecting a checkstop of a failing physical processor; retrieving the failing physical processor's state; replacing by a hypervisor the failing physical processor with a replacement physical processor assigned to a dedicated partition or pool, which dedicated partition or pool has the lowest priority among the priorities of the dedicated partitions and pools; and assigning the retrieved state of the failing physical processor as the state of the replacement physical processor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatus, and products for replacing a failing physical processor according to embodiments of the present invention are described with reference to the accompanying drawings, beginning with FIG. 1. Replacing a failing physical processor according to embodiments of the present invention is implemented in computers, that is, in automated computing machinery. For further explanation, therefore, FIG. 1 sets forth a block diagram of automated computing machinery comprising an exemplary computer (152) useful in replacing a failing physical processor according to embodiments of the present invention. The computer (152) of FIG. 1 includes a number of physical processors (156) as well as random access memory (168) ('RAM') which is connected through a system bus (160) to the physical processors (156) and to other components of the computer.

Stored in RAM (168) are two application programs (158, 210), computer program instructions for user-level data processing. Each application program may run in a separate logical partition. Also stored in RAM (168) are two logical partitions (104, 208), each which has its own operating system (154, 206). The depiction of two partitions here is arbitrary, merely for explanation that typical systems for replacing failing processors according to embodiments of the present invention contain more than one such partition. A logical partition is a subset of the resources of a computer organized and operated as a separate 'virtual' computer. Each logical partition operates independently of other logical partitions on the same computer. Each logical partition runs its own operating system and its own application programs, and each logical partition is assigned all the resources it needs to operate as though it were an independent computer, including processor capacity, memory, and I/O resources.

Logical partitions may be implemented as dedicated partitions, supported by virtual processors having assigned physical processors. Logical partitions also may be implemented as shared processor partition, supported by pools of virtual processors where each pool has assigned physical processors. Logical partitions are referred to in this specification as 'logical partitions,' 'partitions,' or 'LPARs.'

Also stored in RAM (168) are several virtual processors (122, 202, 204), data structures and computer program instructions representing assignments of physical processor resources to logical partitions. Unpooled virtual processor (122) typically will have a physical processor assigned to logical partition directly through the virtual processor, while pooled virtual processors (202, 204) represent processing capacity of physical processors assigned to a pool (153).

Stored in RAM (168) is a hypervisor (184), computer program instructions for managing logical partitions ('LPARs'). The hypervisor (184) administers the assignment of physical resources such as memory and processing resources to LPARs, controls the physical memory locations that can be accessed from within an LPAR, and controls access to I/O memory space. In addition, the hypervisor (184) schedules virtual processors on physical processors and administers the assignment of virtual processors to LPARs. The hypervisor (184) in this example is improved for replacing a failing physical processor in a computer supporting multiple logical partitions according to embodiments of the present invention by assigning priorities to dedicated partitions and to pools of virtual processors, detecting a checkstop of a failing physical processor, retrieving the failing physical processor's state, replacing the failing physical processor with a replacement physical processor assigned to the dedicated partition or pool that has the lowest priority, and assigning the retrieved state of the failing physical processor as the state of the replacement physical processor.

Also stored in RAM (168), internal to logical processors (104, 208) are operating systems (154, 206). Operating systems useful in logical partitions of computers that replace failing processors according to embodiments of the present invention include UNIX™, Linux™, Microsoft XP™, AIX™, IBM's i5/OS™, and others as will occur to those of skill in the art. Hypervisor (184), virtual processors (122, 202, 204), operating systems (154, 206), LPARs (104, 208) and application programs (158, 210) in the example of FIG. 1 are shown in RAM (168), but many components of such software typically are stored in non-volatile memory (166) also.

Figure 1:
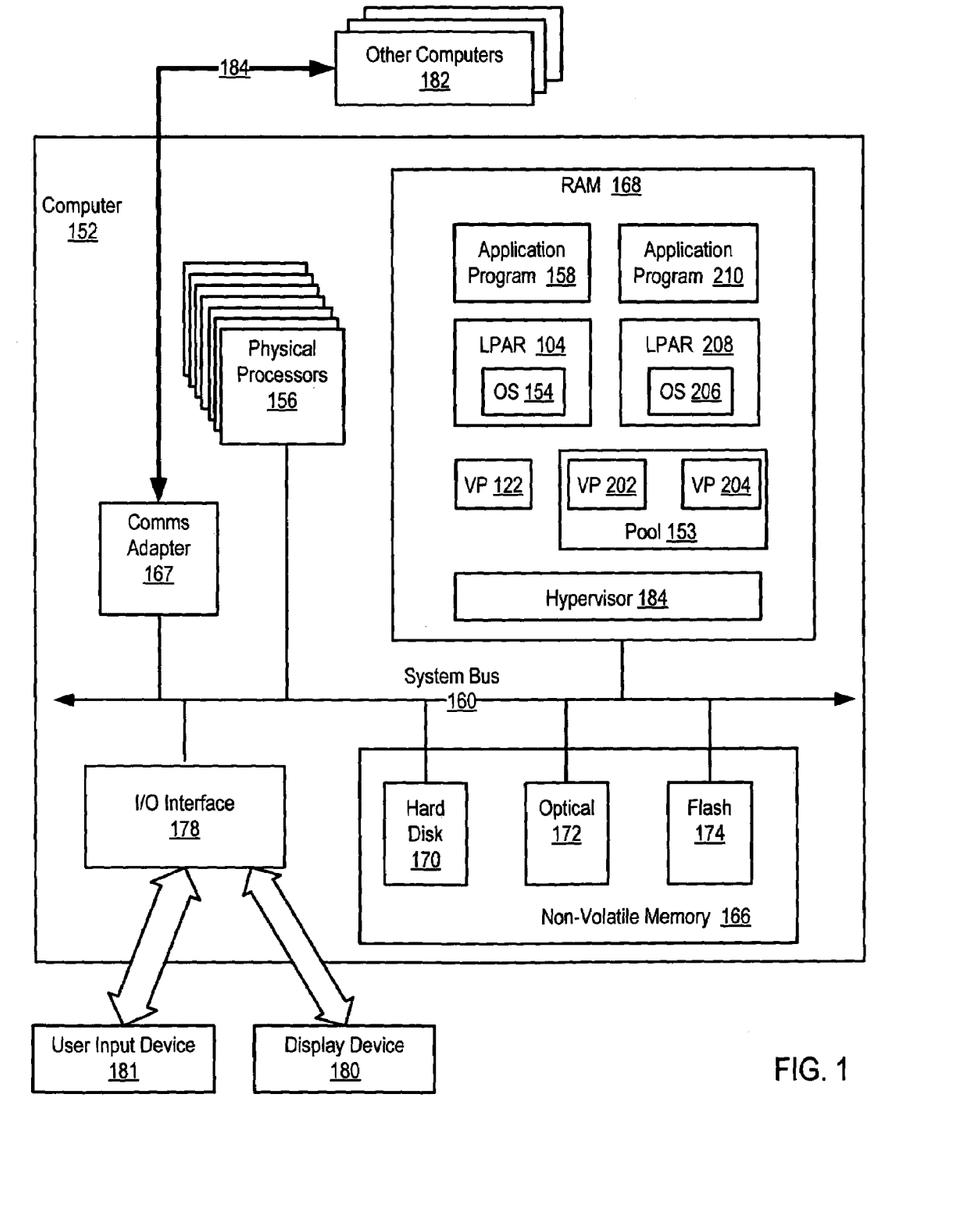
FIG. 1 sets forth a block diagram of automated computing machinery comprising an exemplary computer useful in replacing a failing physical processor according to embodiments of the present invention.

Computer (152) of FIG. 1 includes non-volatile computer memory (166) coupled through a system bus (160) to the physical processors (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 1 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 1 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 2:
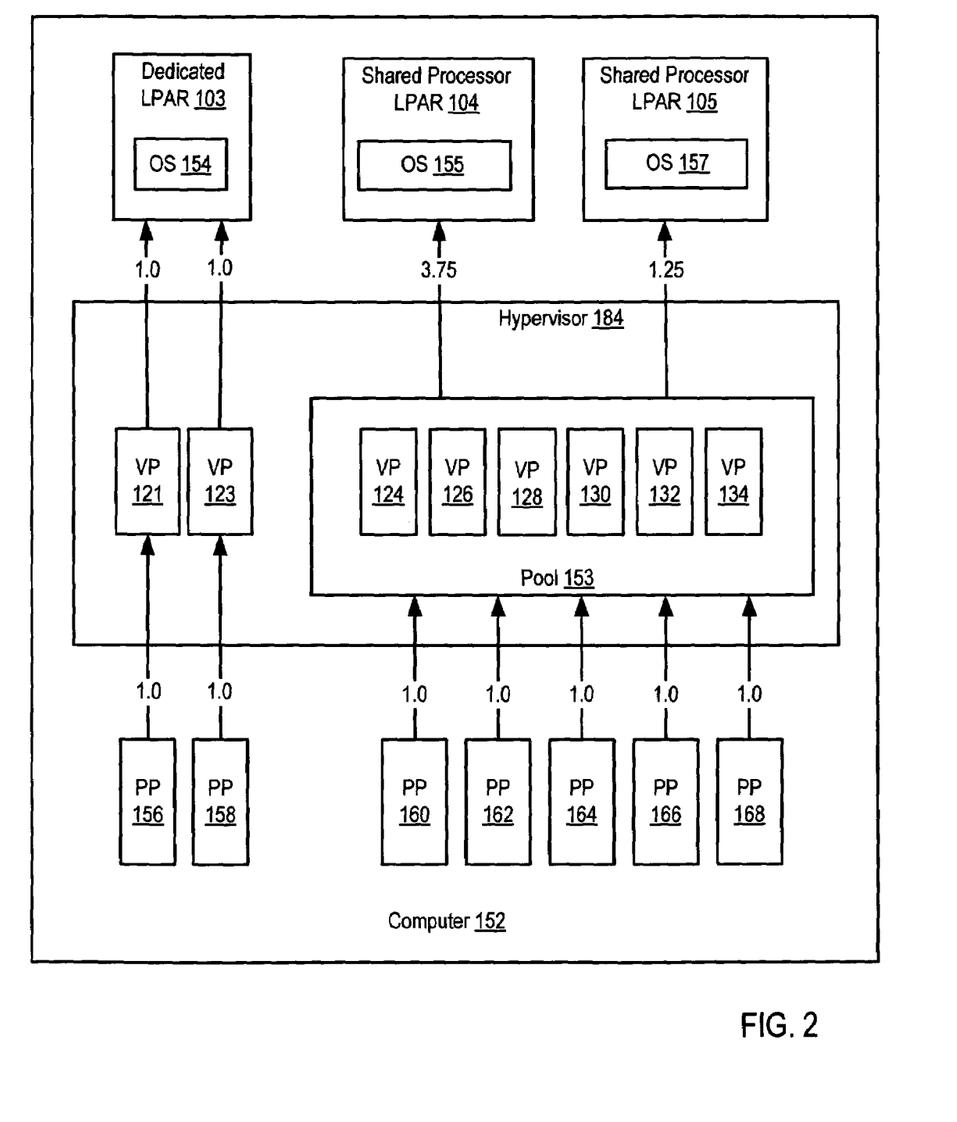
FIG. 2 sets forth a functional block diagram of an exemplary system for replacing a failing physical processor according to embodiments of the present invention.

FIG. 2 sets forth a function block diagram of an exemplary system for replacing a failing physical processor according to embodiments of the present invention. The system of FIG. 2 includes a hypervisor (184), a layer of system software that manages LPARs. The hypervisor (184) in this example is improved for replacing a failing physical processor in a computer supporting multiple logical partitions according to embodiments of the present invention by assigning priorities to dedicated partitions and to pools of virtual processors, detecting a checkstop of a failing physical processor, retrieving the failing physical processor's state, replacing the failing physical processor with a replacement physical processor assigned to the dedicated partition or pool that has the lowest priority, and assigning the retrieved state of the failing physical processor as the state of the replacement physical processor.

FIG. 2 also includes LPARs (103, 104, 105). Each LPAR (103, 104, 105) has an operating system (154, 155, 157) running in it, and each operating system may be different. A system with three LPARs, for example, may simultaneously run Linux™ in one LPAR, IBM's AIX™ in another LPAR, and IBM's i5/OS in another LPAR.

FIG. 2 also includes multiple physical processors (156, 158, 160, 162, 164, 166, 168). Physical processors (156, 158) are assigned exclusively to LPAR (103) through virtual processors (121, 123). An LPAR to which one or more physical processors are so exclusively dedicated is referred to in this specification as a 'dedicated partition' or a 'dedicated LPAR.'

Physical processors (160, 162, 164, 166, 168) in this example are assigned to pool (153), so that the processing capacity of physical processors (160, 162, 164, 166, 168) is shared by LPARs (104, 105) through the virtual processors (124, 126, 128, 130, 132, 134) of pool (153). LPARs (104, 105) share physical processors indirectly through pooled virtual processors, each of which represents all or part of the processing capacity of a physical processor assigned by a hypervisor (184) to each such LPAR (104, 105). Such an LPAR, that indirectly shares physical processors through pooled virtual processors, is referred to in this specification as a 'shared processor partition' or a 'shared processor LPAR.'

In the example of FIG. 2, arrows drawn among the physical processors, virtual processors, the pool, and the LPARs represent processing capacity assigned to LPARs, virtual processors, and the pool. Physical processors may only be assigned as one whole processor, denoted by '1.0' in each arrow linking a physical processor to a virtual processor (121, 123) or to the pool (153). The virtual processors (121, 123) assigned to a dedicated LPAR (103) each represents the processing capacity of 1.0 physical processors. All the processing capacity of the five physical processors (160, 162, 164, 166, 168) is assigned to shared processor LPARs (104, 105) through pool (153), with the processing capacity of 3.75 physical processors assigned to LPAR (104) and the processing capacity of 1.25 processors assigned to LPAR (105).

The number, arrangement, and assignments of physical processors, virtual processors, LPARs, and the pool of virtual processors in the system of FIG. 2 are for explanation only; they are not a limitation of the present invention. A system for replacing a failing physical processor in a computer supporting multiple logical partitions may include any number, arrangement, or assignment of physical processors, virtual processors, LPARs, and pools of virtual processors as may occur to those of skill in the art.

Figure 3:
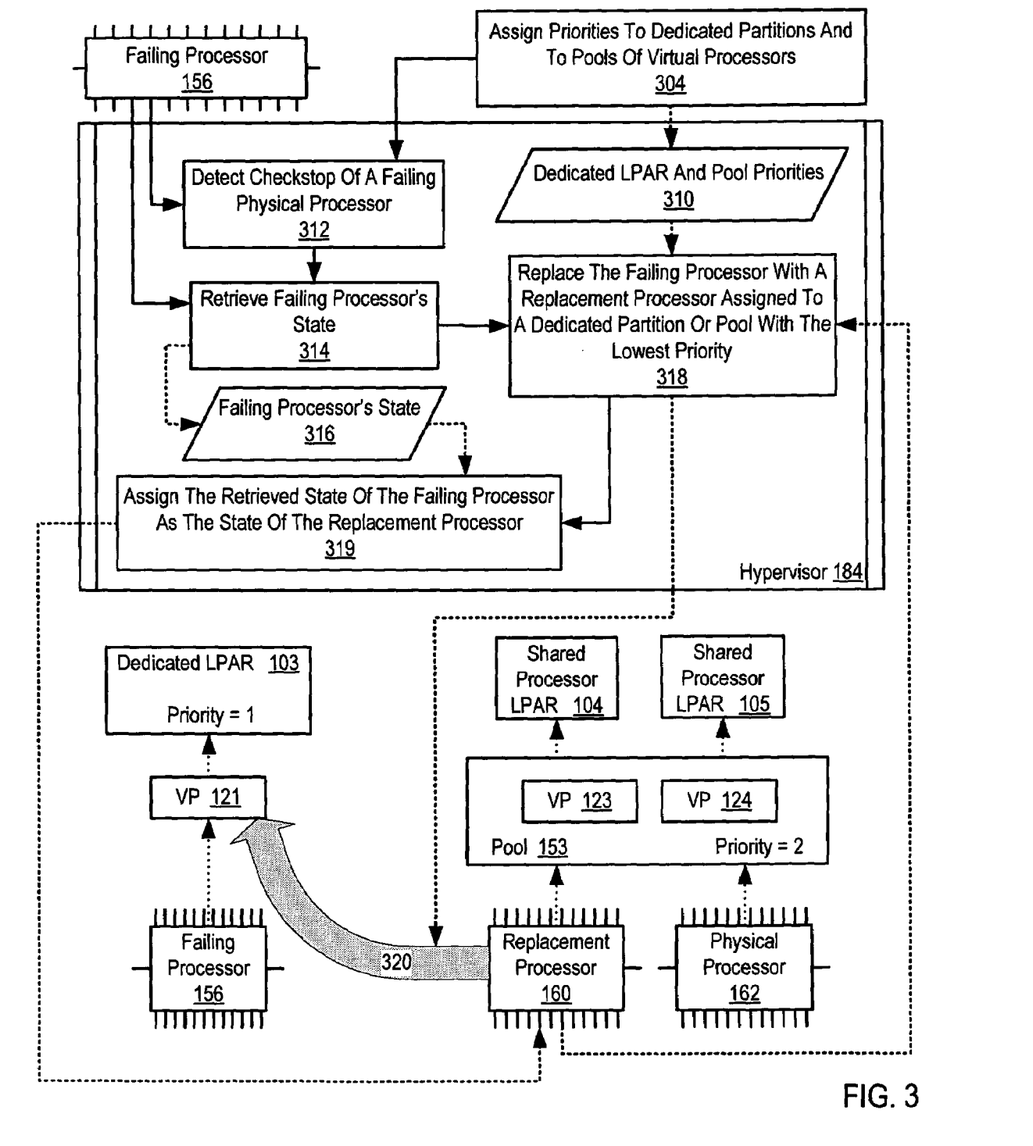
FIG. 3 sets forth a flow chart illustrating an exemplary method for replacing a failing physical processor according to embodiments of the present invention.

For further explanation, FIG. 3 sets forth a flow chart illustrating an exemplary method for replacing a failing physical processor according to embodiments of the present invention. The method of FIG. 3 is carried out in a computer supporting multiple logical partitions (103, 104, 105). The logical partitions include a dedicated partition (103) and shared processor partitions (104, 105). The dedicated partition is supported by a virtual processor (121) having an assigned physical processor (156). The shared processor partitions are supported by a pool (153) of virtual processors (123, 124), and the pool has assigned physical processors (160, 162).

The method of FIG. 3 includes assigning (304) priorities (310) to the dedicated partition (103) (priority=1) and to the pool (153) (priority=2). The priority assignments are ordinal integers with the smallest integer representing the highest priority; 1 is a higher priority than 2, 2 is a higher priority than 3, and so on.

Assigning priorities to partitions may be carried out by use of a console (not shown). Each logical partition may have a console attached to it through which each logical partition looks and functions like an independent computer system. The console allows a user or system administrator to enter commands and view the operation of a logical partition. A 'primary' partition console allows users and administrators to see and manage aspects of all secondary partitions. A 'secondary' partition console allows users or administrators access only to its attached partition.

From such a primary console, secondary partitions are created and managed, including assigning resources such as processors, virtual processors, memory, I/O resources, and so on. Management functions for secondary partitions include power up and power down operations as well as initial program loads. In addition to creating and managing secondary partitions, operations through such a primary partition console can also include establishing pools of virtual processors and assigning priorities to the secondary partitions that are dedicated partitions as well as assigning priorities to the pools of virtual processors. Assigning priorities to partitions also may include monitoring the data processing loads on the partitions and assigning priorities according to the loads, the priority increasing with the load, for example. Alternatively, assigning priorities to partitions may include obtaining priorities from users, monitoring the loads on partitions, and assigning the priorities based upon the loads and comments from users.

The method of FIG. 3 also includes detecting (312) a checkstop of a failing physical processor (156). A 'checkstop,' as the term is used in this specification, is an operating error of a processor sufficiently severe, either by itself or in combination with other errors, to warrant replacement of the processor. Physical processors typically signal processor operating errors with vectored hardware interrupts. Detecting a checkstop may be carried out by vectoring interrupts from processor operating errors of physical processors to an interrupt handling routine of a hypervisor. Any error condition from a physical processor may constitute or cause a checkstop including, for example, memory boundary errors, opcode errors, coprocessor segment errors, memory address errors, arithmetic or floating point errors, memory alignment errors, machine check exceptions, and so on, as will occur to those of skill in the art. Detecting a checkstop may include defining particular errors as individually sufficient to warrant replacement of a processor. Alternatively, detecting a checkstop may include keeping a count of processor operating errors and identifying a checkstop as occurring when the count reaches a predefined threshold.

The method of FIG. 3 also includes retrieving (314) the failing physical processor's state (316). Retrieving (314) the failing physical processor's state (316) may be carried out by a hypervisor's reading the current values of the registers of the processor directly from the processor and storing the values of the registers of the processor temporarily in random access memory outside the physical processor.

The method of FIG. 3 also includes replacing (318) by a hypervisor (184) the failing physical processor (156) with a replacement physical processor (160) assigned to a dedicated partition or pool, which dedicated partition or pool has the lowest priority among the priorities of the dedicated partitions and pools. In the example of FIG. 3, the replacement processor (160) is assigned to pool (153), which has priority=2. Dedicated partition (103) has priority=1. Pool (153) therefore is the dedicated partition or pool with the lowest priority among the priorities of the dedicated partitions and pools of the example of FIG. 3, and a replacement processor is therefore taken from among the physical processors assigned to pool (153). There are two physical processors (160, 162) assigned to pool (153), and either of them may be taken as the replacement processor. In this example, processor (160) is selected as the replacement processor.

In the example of FIG. 3, processor (156) is a failing physical processor assigned to dedicated LPAR (103) through virtual processor (121). In this example, replacing the failing physical processor is carried out by reassigning (320) replacement processor (160) from pool (153) to virtual processor (121). The replacement of the failing processor is carried out by the hypervisor completely transparently to partition (103). An operating system of partition (103) that dispatches threads of execution on virtual processor (121) continues to dispatch threads of execution on virtual processor (121) with no knowledge of the fact that physical processor (156) failed and was replaced by physical processor (160).

The method of FIG. 3 also includes assigning (319) the retrieved state (316) of the failing physical processor (156) as the state of the replacement physical processor (160). The retrieved state of the failing physical processor is composed of the values of the registers of the failing physical processor when the checkstop of the failing processor was detected by the hypervisor. Assigning (319) the retrieved state (316) of the failing physical processor (156) as the state of the replacement physical processor (160) may be carried out by storing the retrieved state (316) in the registers of the replacement physical processor (160).

Figure 4:
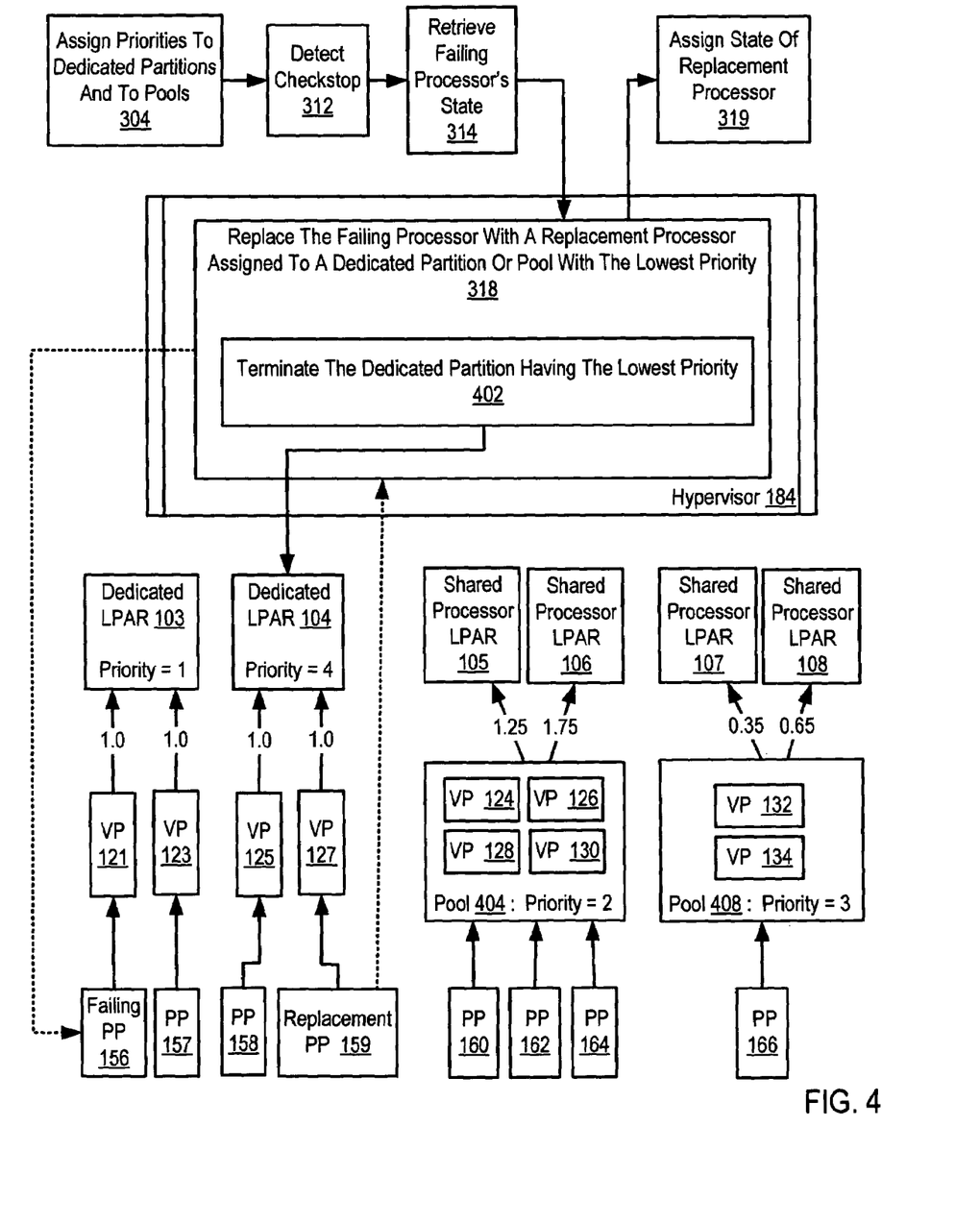
FIG. 4 sets forth a flow chart illustrating a further exemplary method for replacing a failing physical processor according to embodiments of the present invention.

For further explanation, FIG. 4 sets forth a flow chart illustrating a further exemplary method for replacing a failing physical processor according to embodiments of the present invention. Like the method of FIG. 3, the method of FIG. 4 is carried out in a computer supporting multiple logical partitions (103, 104, 105, 106, 107, 108). The logical partitions include dedicated partitions (103, 104) and shared processor partitions (105, 106, 107, 108). The dedicated partitions are supported by virtual processors (121, 123, 125, 127) each of which has an assigned physical processor (156, 157, 158, 159). The shared processor partitions are supported by pools (404, 408) of virtual processors (124, 126, 128, 130, 132, 134), and the pools have assigned physical processors, with physical processors (160, 162, 164) assigned to pool (404) and physical processor (166) assigned to pool (408). The method of FIG. 4 is similar also to the method of FIG. 3 in that the method of FIG. 4 includes assigning (304) priorities to dedicated partitions and to pools of virtual processors, detecting (312) a checkstop of a failing physical processor of a partition, retrieving (314) the failing physical processor's state, and assigning (319) the retrieved state of the failing physical processor as the state of the replacement physical processor—all of which operate in a manner similar to the method of FIG. 3 as described above.

The method of FIG. 4 also includes replacing (318) by a hypervisor (184) the failing physical processor (156) with a replacement physical processor (159) assigned to a dedicated partition or pool, which dedicated partition or pool has the lowest priority among the priorities of the dedicated partitions and pools. In the example of FIG. 4, however, dedicated partition (103) has priority=1; dedicated partition (104) has priority=4; pool (404) has priority=2; and pool (408) has priority=3. Dedicated partition (104) therefore is the dedicated partition or pool having the lowest priority among the priorities of the dedicated partitions and pools, and it is therefore from the physical processors assigned to virtual processors of dedicated partition (104) that a replacement processor is to be taken, in this example, replacement processor (159).

In the method of FIG. 4, where the dedicated partition or pool having the lowest priority is dedicated partition (104), replacing (318) the failing physical processor (156) with a replacement physical processor (159) assigned to a dedicated partition or pool having the lowest priority includes terminating (402) the dedicated partition having the lowest priority, that is, terminating dedicated partition (104). Terminating dedicated partition (104) may be carried out by halting any application programs running on the partition (104), halting the operating system running on the partition (104), and powering down partition (104) by hypervisor (184).

Figure 5:
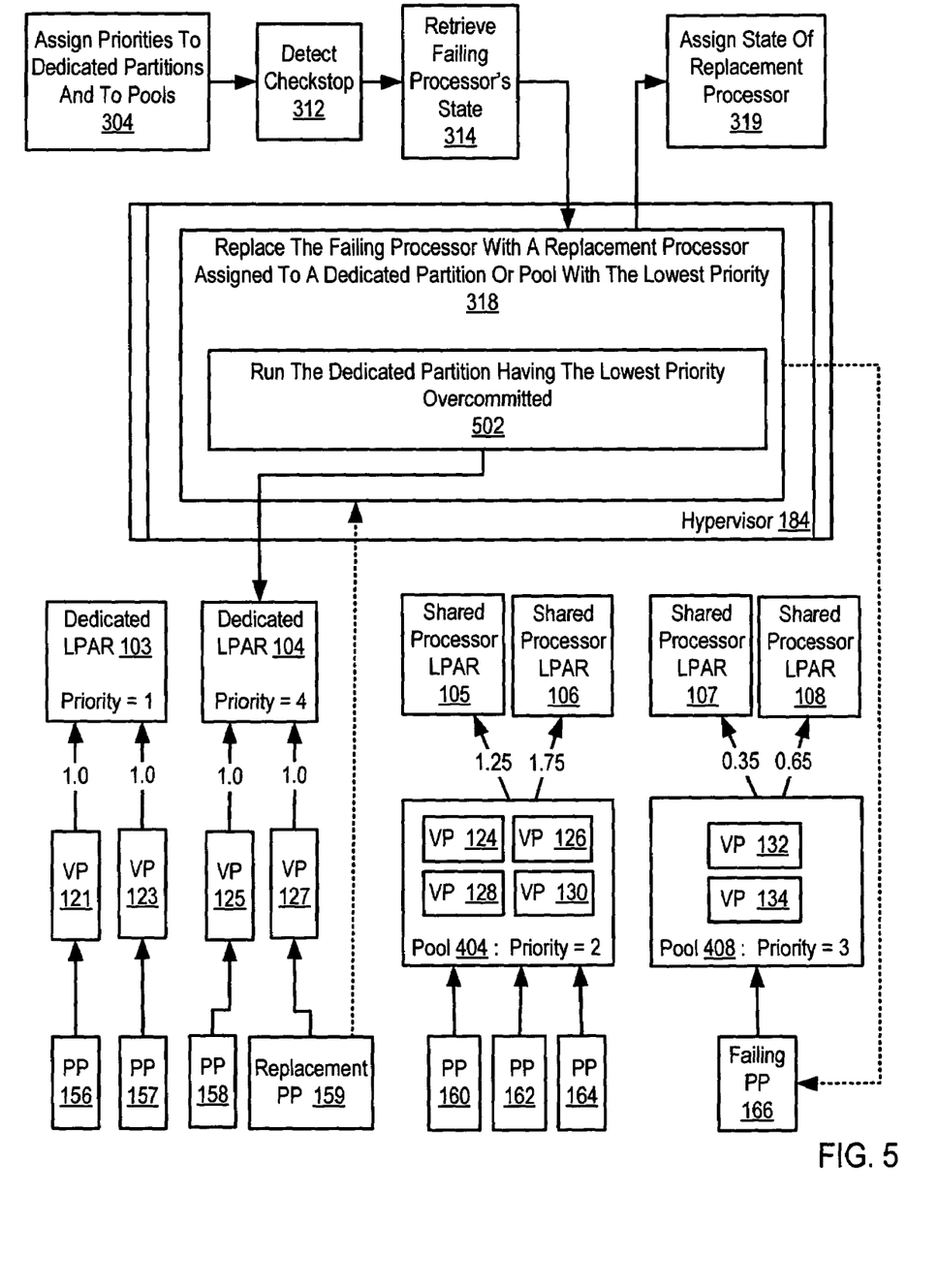
FIG. 5 sets forth a flow chart illustrating a further exemplary method for replacing a failing physical processor according to embodiments of the present invention.

For further explanation, FIG. 5 sets forth a flow chart illustrating a further exemplary method for replacing a failing physical processor according to embodiments of the present invention. Like the method of FIG. 3, the method of FIG. 5 is carried out in a computer supporting multiple logical partitions (103, 104, 105, 106, 107, 108). The logical partitions include dedicated partitions (103, 104) and shared processor partitions (105, 106, 107, 108). The dedicated partitions are supported by virtual processors (121, 123, 125, 127) each of which has an assigned physical processor (156, 157, 158, 159). The shared processor partitions are supported by pools (404, 408) of virtual processors (124, 126, 128, 130, 132, 134), and the pools have assigned physical processors, with physical processors (160, 162, 164) assigned to pool (404) and physical processor (166) assigned to pool (408). The method of FIG. 5 is similar also to the method of FIG. 3 in that the method of FIG. 5 includes assigning (304) priorities to dedicated partitions and to pools of virtual processors, detecting (312) a checkstop of a failing physical processor of a partition, retrieving (314) the failing physical processor's state, and assigning (319) the retrieved state of the failing physical processor as the state of the replacement physical processor—all of which operate in a manner similar to the method of FIG. 3 as described above.

The method of FIG. 5 also includes replacing (318) by a hypervisor (184) the failing physical processor (166) with a replacement physical processor (159) assigned to a dedicated partition or pool, which dedicated partition or pool has the lowest priority among the priorities of the dedicated partitions and pools. In the example of FIG. 5, however, dedicated partition (103) has priority=1; dedicated partition (104) has priority=4; pool (404) has priority=2; and pool (408) has priority=3. Dedicated partition (104) therefore is the dedicated partition or pool having the lowest priority among the priorities of the dedicated partitions and pools, and it is therefore from the physical processors assigned to virtual processors of dedicated partition (104) that a replacement processor is to be taken, in this example, replacement processor (159).

In the method of FIG. 5, where the dedicated partition or pool having the lowest priority is dedicated partition (104), replacing (318) the failing physical processor (166) with a replacement physical processor (159) assigned to a dedicated partition or pool having the lowest priority includes running (502) the dedicated partition having the lowest priority overcommitted, that is, running dedicated partition (104) overcommitted.

Running a dedicated partition overcommitted means that the processing capacity represented by virtual processors supporting the partition is greater than the number of physical processors assigned to provide that capacity. Hypervisor (184) runs a dedicated partition overcommitted by reducing proportionately the amount of time in which each virtual processor is dispatched. When dedicated partition (104) is run overcommitted, instead of dispatching the two virtual processors (125, 127) into all the processor time available on two physical processors (158, 159), hypervisor (184) now may dispatch two virtual processors onto only one physical processor, meaning that each virtual processor will appear to the operating system in partition (104) to be running at about half speed. When running overcommitted, therefore, dedicated partition (104) will not reach the performance indicated by the amount of processing capacity nominally represented by the virtual processors supporting the partition; the operating system and application programs in the dedicated partition will run with degraded performance. The operating system and application programs in the partition running overcommitted will, however, continue to run, which in many circumstances is preferable to termination.

Figure 6:
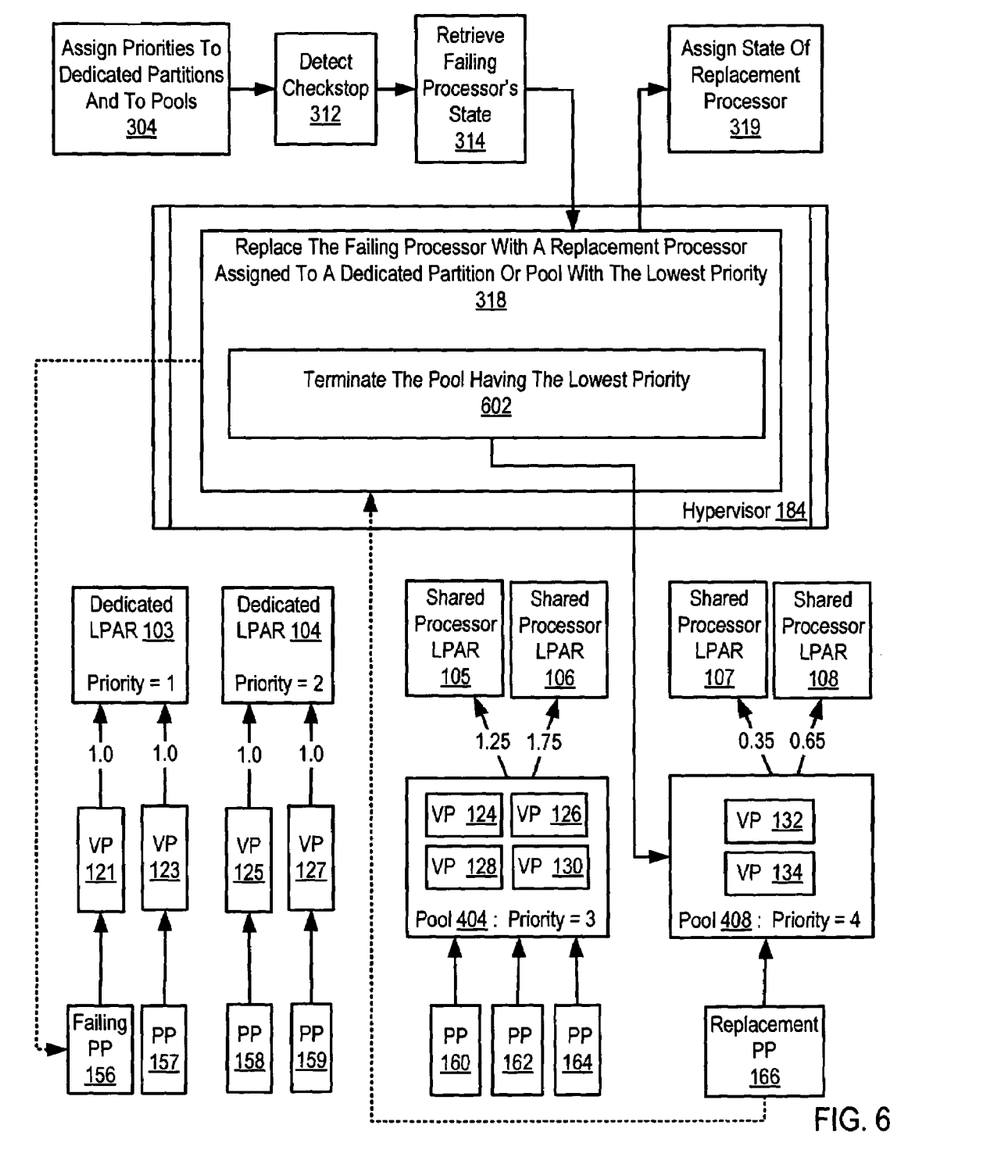
FIG. 6 sets forth a flow chart illustrating a further exemplary method for replacing a failing physical processor according to embodiments of the present invention.

For further explanation, FIG. 6 sets forth a flow chart illustrating a further exemplary method for replacing a failing physical processor according to embodiments of the present invention. Like the method of FIG. 3, the method of FIG. 6 is carried out in a computer supporting multiple logical partitions (103, 104, 105, 106, 107, 108). The logical partitions include dedicated partitions (103, 104) and shared processor partitions (105, 106, 107, 108). The dedicated partitions are supported by virtual processors (121, 123, 125, 127) each of which has an assigned physical processor (156, 157, 158, 159). The shared processor partitions are supported by pools (404, 408) of virtual processors (124, 126, 128, 130, 132, 134), and the pools have assigned physical processors, with physical processors (160, 162, 164) assigned to pool (404) and physical processor (166) assigned to pool (408). The method of FIG. 6 is similar also to the method of FIG. 3 in that the method of FIG. 6 includes assigning (304) priorities to dedicated partitions and to pools of virtual processors, detecting (312) a checkstop of a failing physical processor of a partition, retrieving (314) the failing physical processor's state, and assigning (319) the retrieved state of the failing physical processor as the state of the replacement physical processor—all of which operate in a manner similar to the method of FIG. 3 as described above.

The method of FIG. 6 also includes replacing (318) by a hypervisor (184) the failing physical processor (156) with a replacement physical processor (166) assigned to a dedicated partition or pool, which dedicated partition or pool has the lowest priority among the priorities of the dedicated partitions and pools. In the example of FIG. 6, however, dedicated partition (103) has priority=1; dedicated partition (104) has priority=2; pool (404) has priority=3; and pool (408) has priority=4. Pool (408) therefore is the dedicated partition or pool having the lowest priority among the priorities of the dedicated partitions and pools, and it is therefore from the physical processors assigned to pool (408) that a replacement processor is to be taken. In this example, the only processor assigned to pool (408) is physical processor (166), and processor (166) is therefore taken as the replacement processor in this example.

In the method of FIG. 6, where the dedicated partition or pool having the lowest priority is pool (408), replacing (318) the failing physical processor (156) with a replacement physical processor (166) assigned to a dedicated partition or pool having the lowest priority includes terminating (602) the pool having the lowest priority, that is, terminating pool (408). Terminating pool (408) may be carried out by halting any application programs running on shared processor partitions (107, 108) supported by virtual processors of pool (408), halting the operating systems running in partitions (107, 108) supported by pool (408), and powering down by hypervisor (184) partitions (107, 108) supported by pool (408).

In the method of FIG. 6, where replacing (318) the failing physical processor (156) with a replacement physical processor (166) includes terminating (602) the pool having the lowest priority, that is, terminating pool (408), pool (408) has only one assigned physical processor, processor (166). In this particular example, configured for clarity of explanation, using the only physical processor assigned to the pool as a replacement processor necessarily requires terminating pool (408). That the pool with lowest priority has only one assigned physical processor, however, is an example for explanation only and not a limitation of the present invention. The pool having lowest priority may have one of its physical processors taken as a replacement processor in the method of FIG. 6, and the method still includes terminating the lowest priority pool, regardless of the number of physical processors assigned to the lowest priority pool.

Figure 7:
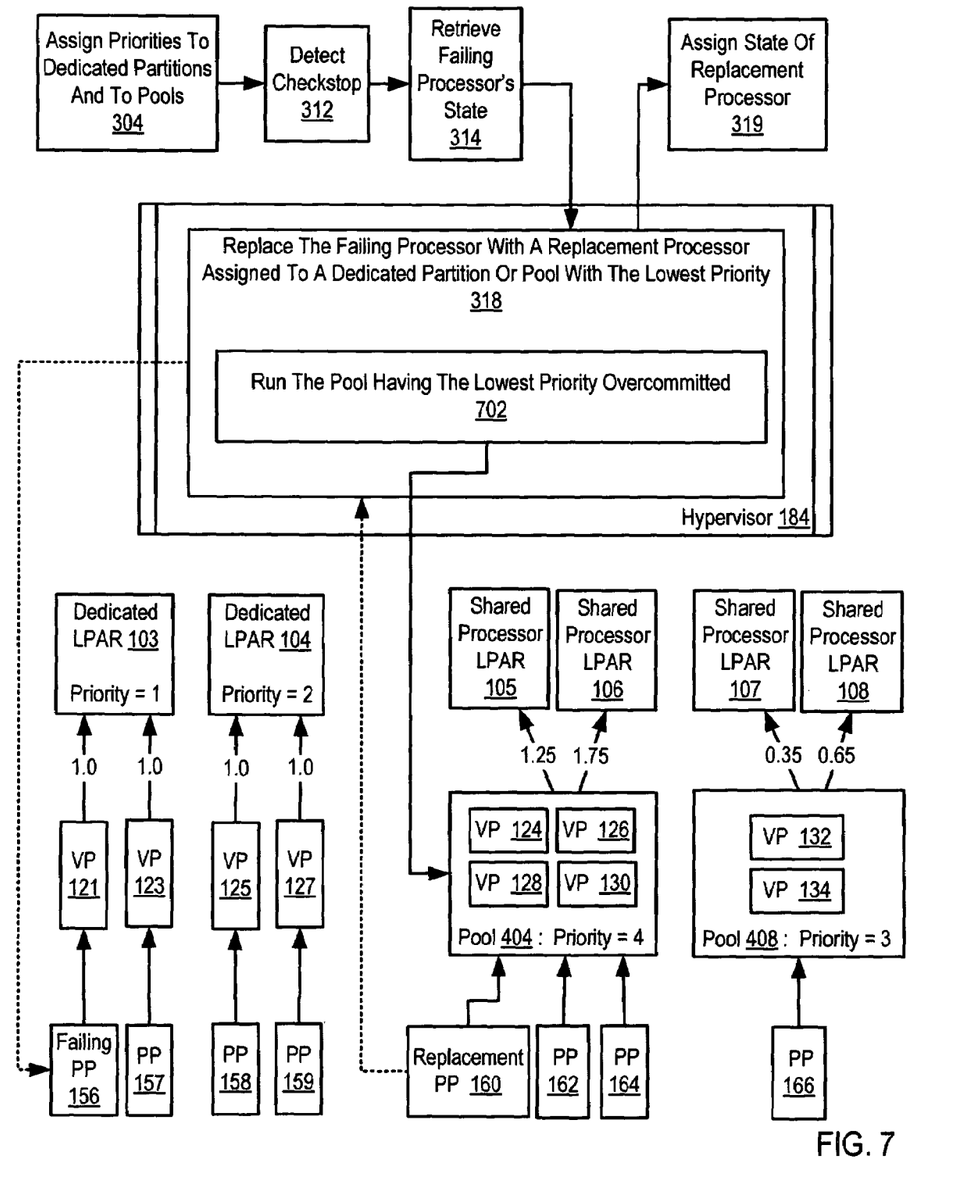
FIG. 7 sets forth a flow chart illustrating a further exemplary method for replacing a failing physical processor according to embodiments of the present invention.

For further explanation, FIG. 7 sets forth a flow chart illustrating a further exemplary method for replacing a failing physical processor according to embodiments of the present invention. Like the method of FIG. 3, the method of FIG. 7 is carried out in a computer supporting multiple logical partitions (103, 104, 105, 106, 107, 108). The logical partitions include dedicated partitions (103, 104) and shared processor partitions (105, 106, 107, 108). The dedicated partitions are supported by virtual processors (121, 123, 125, 127) each of which has an assigned physical processor (156, 157, 158, 159). The shared processor partitions are supported by pools (404, 408) of virtual processors (124, 126, 128, 130, 132, 134), and the pools have assigned physical processors, with physical processors (160, 162, 164) assigned to pool (404) and physical processor (166) assigned to pool (408). The method of FIG. 7 is similar also to the method of FIG. 3 in that the method of FIG. 7 includes assigning (304) priorities to dedicated partitions and to pools of virtual processors, detecting (312) a checkstop of a failing physical processor of a partition, retrieving (314) the failing physical processor's state, and assigning (319) the retrieved state of the failing physical processor as the state of the replacement physical processor—all of which operate in a manner similar to the method of FIG. 3 as described above.

The method of FIG. 7 also includes replacing (318) by a hypervisor (184) the failing physical processor (156) with a replacement physical processor (160) assigned to a dedicated partition or pool, which dedicated partition or pool has the lowest priority among the priorities of the dedicated partitions and pools. In the example of FIG. 7, however, dedicated partition (103) has priority=1; dedicated partition (104) has priority=2; pool (404) has priority=4; and pool (408) has priority=3. Pool (404) therefore is the dedicated partition or pool having the lowest priority among the priorities of the dedicated partitions and pools, and it is therefore from the physical processors assigned to pool (404) that a replacement processor is to be taken, in this example, replacement processor (160).

In the method of FIG. 7, where the dedicated partition or pool having the lowest priority is pool (404), replacing (318) the failing physical processor (156) with a replacement physical processor (160) assigned to a dedicated partition or pool having the lowest priority includes running (702) the pool having the lowest priority overcommitted, that is, running pool (404) overcommitted.

Running a pool overcommitted means that the processing capacity represented by virtual processors of the pool is greater than the number of physical processors assigned to the pool. Hypervisor (184) runs a pool overcommitted by reducing proportionately the amount of time in which each virtual processor is dispatched. When pool (104) is run overcommitted, instead of dispatching the virtual processors (124, 126, 128, 130) of the pool so as to provide the processing capacity of 1.25 processors to shared processor partition (105) and the processing capacity of 1.75 processors to shared processor partition (106), hypervisor (184) now may dispatch one-third less processing capacity to each shared processor partition (105, 106), meaning that each virtual processor of the pool will appear to the operating systems in partitions (105, 106) to be running at about two-thirds the speed at which they should be running. When running overcommitted, therefore, pool (404) will not provide the performance indicated by the amount of processing capacity nominally represented by the virtual processors of the pool; the operating system and application programs in the partitions supported by the pool will run with degraded performance. The operating system and application programs in the partitions supported by a pool running overcommitted will, however, continue to run, which in many circumstances is preferable to termination.

Exemplary embodiments of the present invention are described largely in the context of a fully functional computer system for replacing a failing physical processor. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web.

Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for replacing a failing physical processor in a computer supporting multiple logical partitions, the logical partitions including dedicated partitions and shared processor partitions, the dedicated partitions supported by virtual processors having assigned physical processors, the shared processor partitions supported by pools of virtual processors, the pools having assigned physical processors, the method comprising:

assigning priorities to the dedicated partitions and to the pools of virtual processors;

detecting a checkstop of a failing physical processor;

retrieving the failing physical processor's state;

replacing by a hypervisor the failing physical processor with a replacement physical processor assigned to a dedicated partition or pool, which dedicated partition or pool has the lowest priority among the priorities of the dedicated partitions and pools, wherein the dedicated partition or pool having the lowest priority is a dedicated partition, and replacing the failing physical processor includes terminating the dedicated partition having the lowest priority; and assigning the retrieved state of the failing physical processor as the state of the replacement physical processor.

2. A method for replacing a failing physical processor in a computer supporting multiple logical partitions, the logical partitions including dedicated partitions and shared processor partitions, the dedicated partitions supported by virtual processors having assigned physical processors, the shared processor partitions supported by pools of virtual processors, the pools having assigned physical processors, the method comprising:

assigning priorities to the dedicated partitions and to the pools of virtual processors;

detecting a checkstop of a failing physical processor;

retrieving the hum physical processor's state;

replacing by a hypervisor the failing physical processor with a replacement physical processor assigned to a dedicated partition or pool, which dedicated partition or pool has the lowest priority among the priorities of the dedicated partitions and pools, wherein the dedicated partition or pool having the lowest priority is a dedicated partition, and replacing the failing physical processor includes running the dedicated partition having the lowest priority overcommitted; and assigning the retrieved state of the failing physical processor as the state of the replacement physical processor.

3. A method for replacing a failing physical processor in a computer supporting multiple logical partitions, the logical partitions including dedicated partitions and shared processor partitions, the dedicated partitions supported by virtual processors having assigned physical processors, the shared processor partitions supported by pools of virtual processors, the pools having assigned physical processors, the method comprising:

assigning priorities to the dedicated partitions and to the pools of virtual processors;

detecting a checkstop of a failing physical processor;

retrieving the failing physical processor's state;

replacing by a hypervisor the failing physical processor with a replacement physical processor assigned to a dedicated partition or pool, which dedicated partition or pool has the lowest priority among the priorities of the dedicated partitions and pools, wherein the dedicated partition or pool having the lowest priority is a pool, and replacing the failing physical processor includes terminating the pool having the lowest priority; and assigning the retrieved state of the failing physical processor as the state of the replacement physical processor.

4. A method for replacing a failing physical processor in a computer supporting multiple logical partitions, the logical partitions including dedicated partitions and shared processor partitions, the dedicated partitions supported by virtual processors having assigned physical processors, the shared processor partitions supported by pools of virtual processors, the pools having assigned physical processors, the method comprising:

assigning priorities to the dedicated partitions and to the pools of virtual processors;

detecting a checkstop of a failing physical processor;

retrieving the failing physical processor's state;

replacing by a hypervisor the failing physical processor with replacement physical processor assigned to a dedicated partition or pool, which dedicated partition or pool has the lowest priority among the priorities of the dedicated partitions and pools, wherein the dedicated partition or pool having the lowest priority is a pool, and replacing the failing physical processor includes running the pool having the lowest priority overcommitted; and assigning the retrieved state of the failing physical processor as the state of the replacement physical processor.

* * * * *